United States Patent [19]
Lewis

[11] 4,054,923
[45] Oct. 18, 1977

[54] BELT DRIVEN TAPE TRANSPORT WITH RE-POSITIONED REEL

[75] Inventor: Richard A. Lewis, Sherman Oaks, Calif.

[73] Assignee: Interdyne Company, Van Nuys, Calif.

[21] Appl. No.: 693,136

[22] Filed: June 7, 1976

Related U.S. Application Data

[63] Continuation-in-part of Ser. No. 680,195, April 26, 1976.

[51] Int. Cl.² .................. G11B 15/04; G11B 15/32; G11B 15/66
[52] U.S. Cl. .................. 360/60; 242/181; 242/192; 242/195; 242/198; 360/95
[58] Field of Search .......... 242/192, 180, 181, 68.3, 242/198, 197, 210, 195, 68.7, 78.7, 58.6, 75.1; 360/90, 95, 96, 60

[56] References Cited

U.S. PATENT DOCUMENTS

| | | | |
|---|---|---|---|
| 2,524,106 | 10/1950 | Hanson | 242/58.6 |
| 2,743,878 | 5/1956 | Masterson | 242/192 |
| 3,635,424 | 1/1972 | Morello et al. | 242/68.3 |

*Primary Examiner*—George F. Mautz
*Attorney, Agent, or Firm*—White and Haefliger

[57] ABSTRACT

A tape transport assembly typically employing a belt drive for the tape comprises:

a. a pair of reels for tape to be transported from a supply roll on one reel to a take-up roll on the other reel, b. at least one peripheral support to peripherally engage one of said reels to position same upon initial reception thereof in said assembly, and c. centering support means carried by the assembly for relative movement into and out of centrally supporting position in which said one reel is displaced out of peripheral engagement with said peripheral support and is centrally supported for rotation.

19 Claims, 28 Drawing Figures

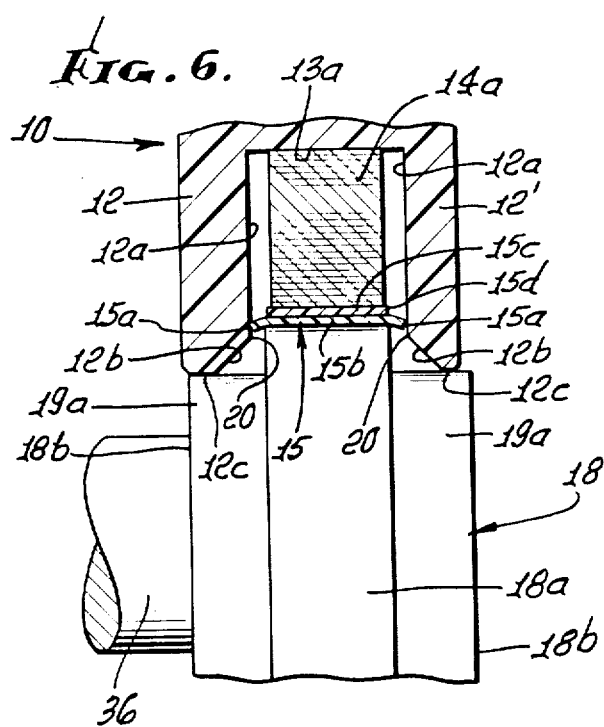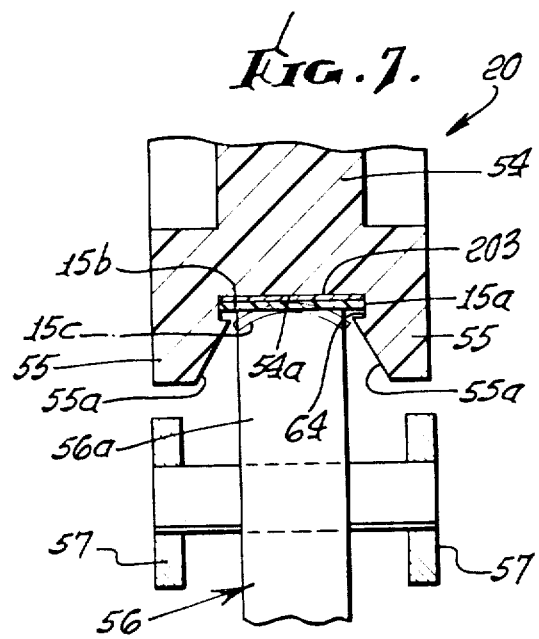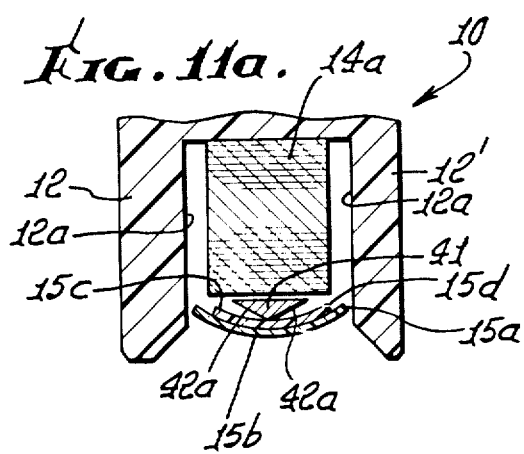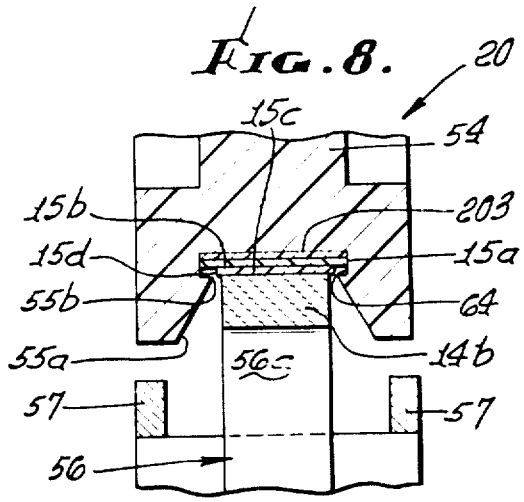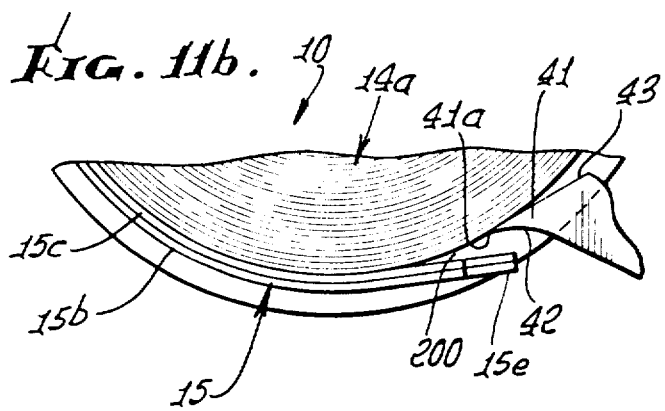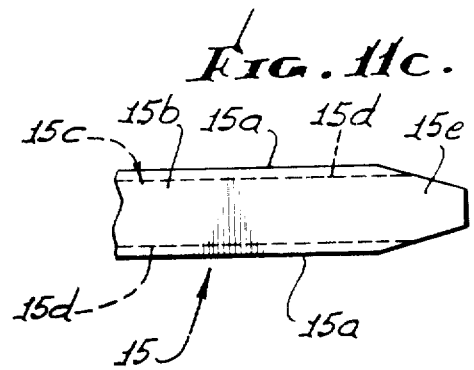

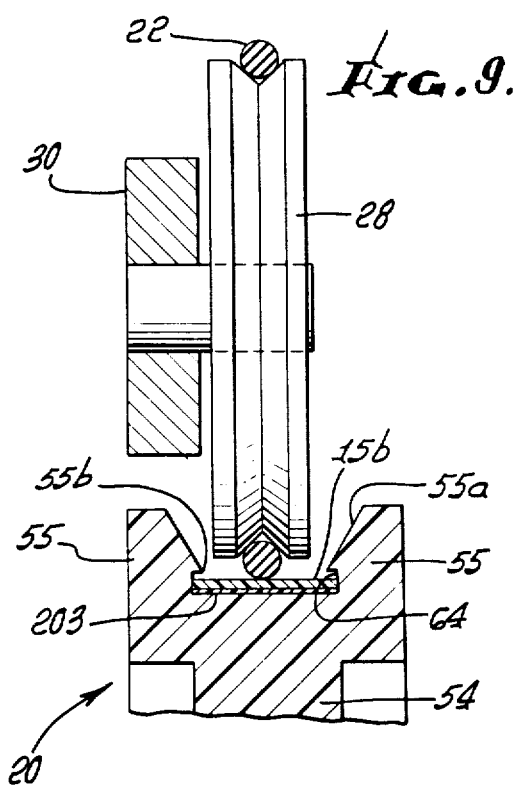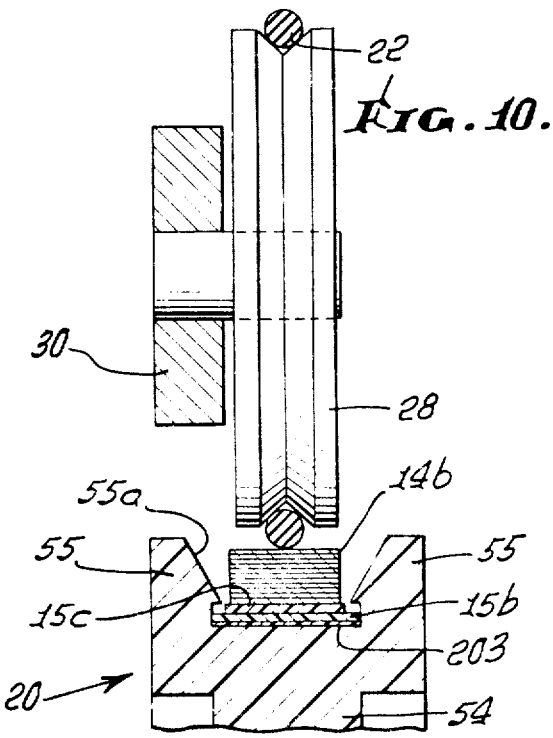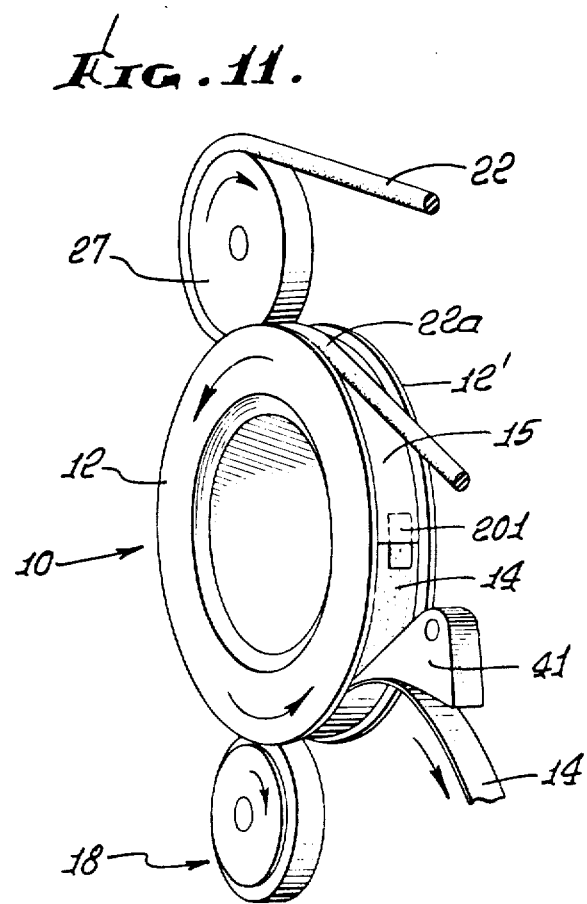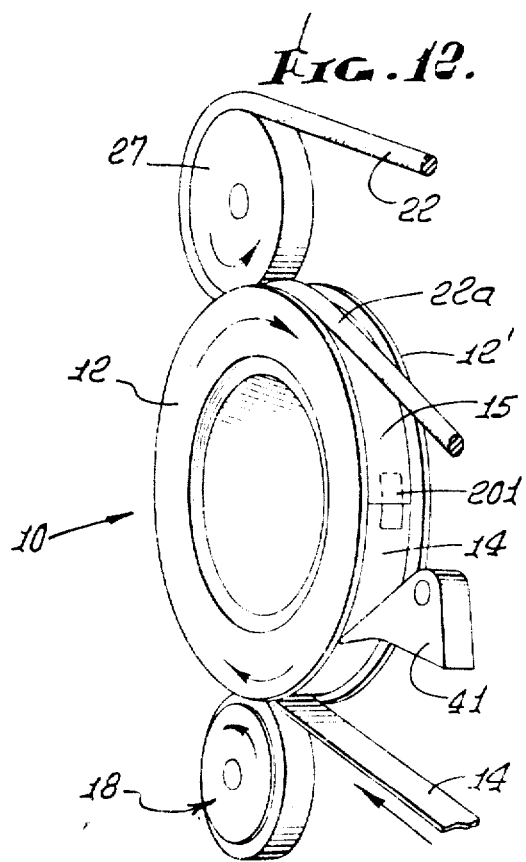

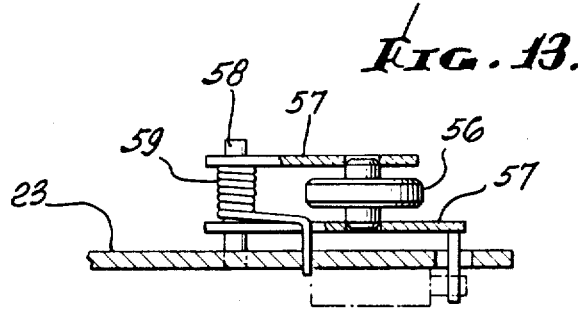
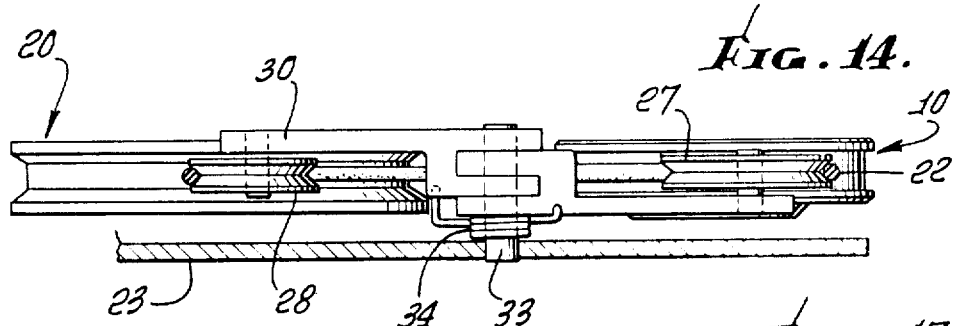
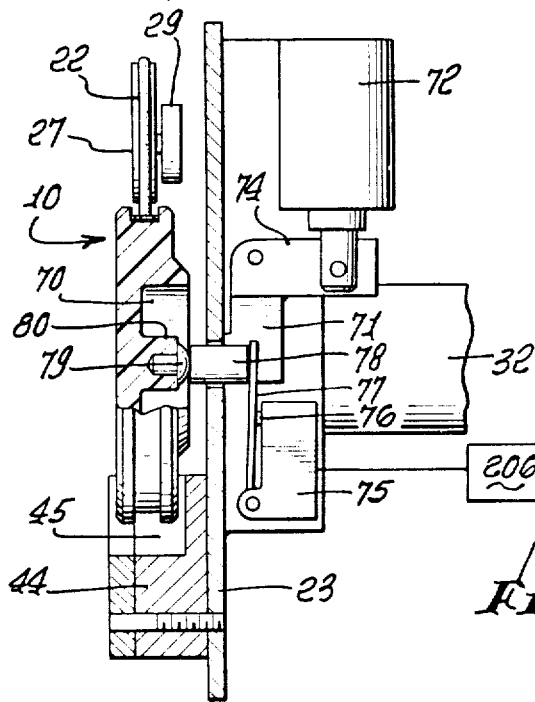
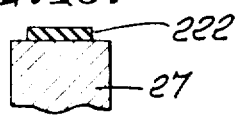
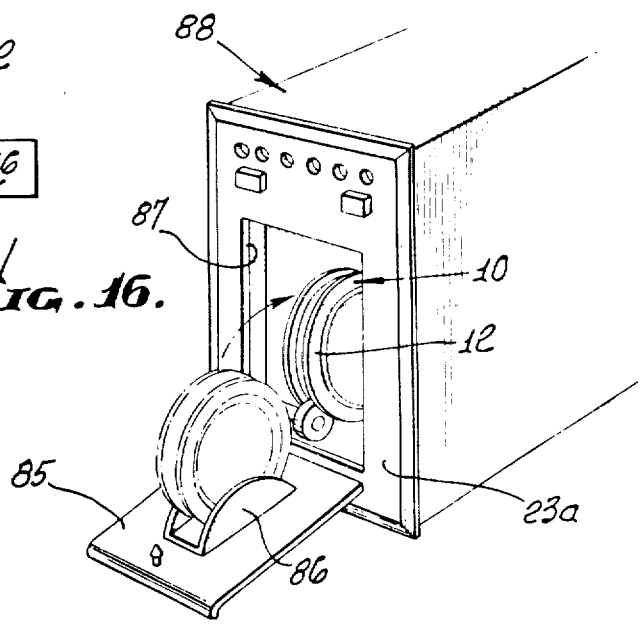

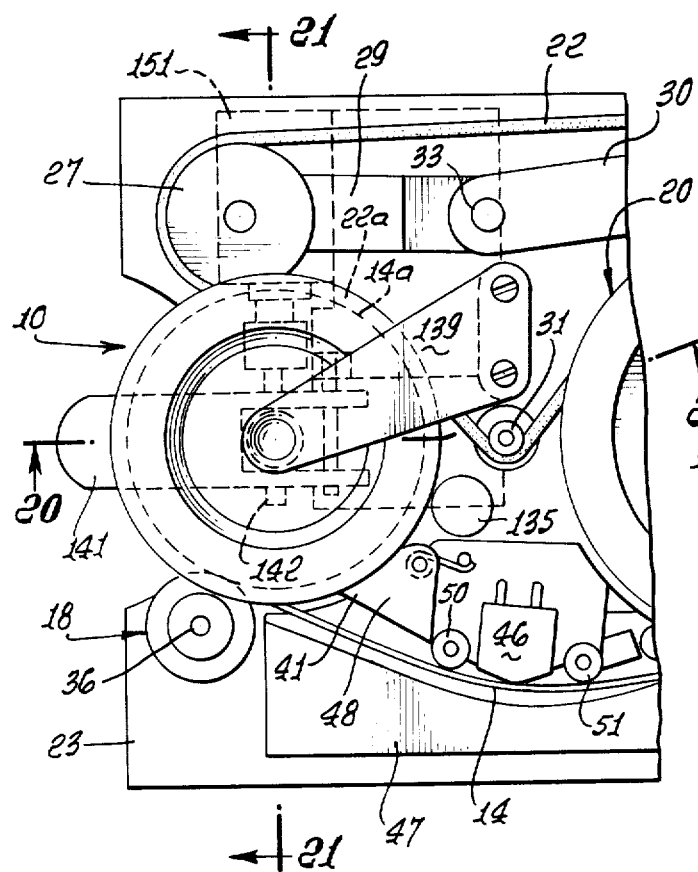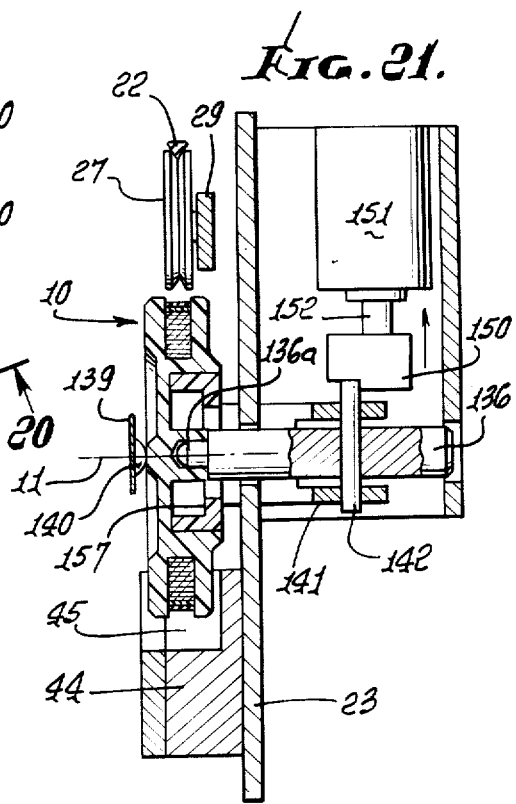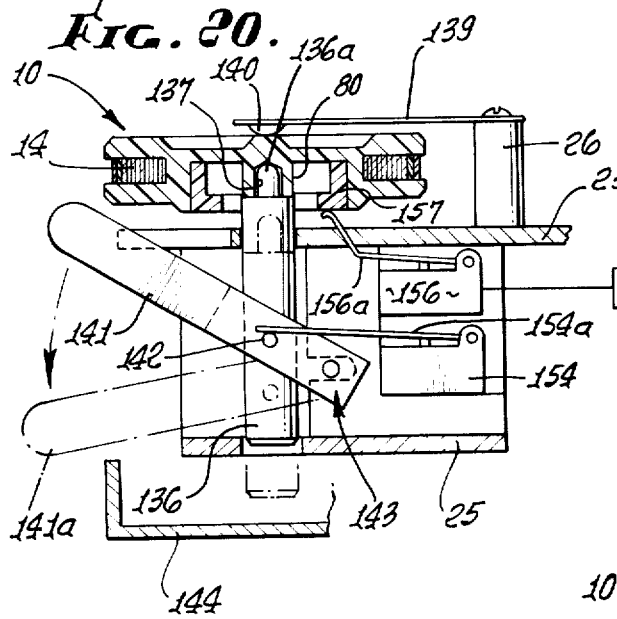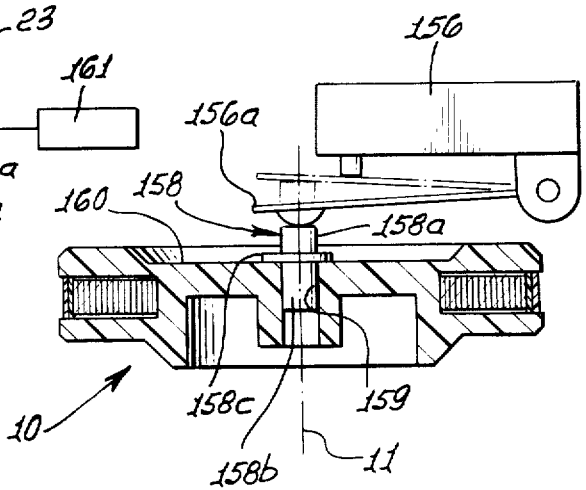

BELT DRIVEN TAPE TRANSPORT WITH RE-POSITIONED REEL

BACKGROUND OF THE INVENTION

This application is a continuation-in-part of my co-pending application Ser. No. 680,195, filed Apr. 26, 1976 and entitled, "Belt Drive for Tape Transport, With Floating Rotor Drive Pressure Application".

This invention relates generally to tape transports, and more particularly concerns magnetic tape transports of the type in which an endless belt engages and drives tape rolls on rotary tape reels.

Prior belt driven transports are exemplified by the U.S. Pat. Nos. 3,907,230 to Merle; 3,692,255 to Von Behren; 2,743,878 to Masterson; and 3,808,902 to Grant. In certain of these the belt is guided over rollers which are fixed in relation to a frame; and in the Merle patent the belt roller is movable relative to the frame but its movement and location in relation to driven tape rolls is subject to tension in the belt. None of such patents is concerned with a belt drive in which the support of the belt and at least one belt driven tape roll is such as to readily accommodate removal and replacement of that tape roll; and none of such patents is concerned with a drive in which tape rolls are driven by a belt urged by separate rollers toward the tape rolls, a spring means other than the belt being employed to accomplish such urging. Further, effective self-feeding of tape between the tape reels is not suggested by such belt drive transport patents.

Accordingly, the prior art is generally characterized by structural and operational deficiencies, responsible for less than highly satisfactory results.

SUMMARY OF THE INVENTION

It is a major object of the present invention to provide a belt driven tape transport overcoming the above mentioned deficiencies and problems, and to provide an unusually satisfactory transport characterized by certain advantages which are unusual in their combination.

Basically, the transport assembly embodies the following:

a. a pair of reels for tape to be transported from a supply roll on one reel to a take-up roll on the other reel, b. at least one peripheral support to peripherally engage one of said reels to position same upon initial reception thereof in said assembly, and c. centering support means carried by the assembly for relative movement into and out of centrally supporting position in which said one reel is displaced out of peripheral engagement with said peripheral support and is centrally supported for rotation.

As will be seen, removability and replaceability of one tape roll and associated reel is especially enhanced and accommodated through initial peripheral "three-point" support; centering of that reel and roll relative to a frame is initially provided by two auxiliary elements engaging the reel periphery, together with one of the two previously mentioned rollers swingable on an arm to yieldably urge the belt to arcuately engage the tape; and subsequent centering of that reel and roll during tape transport is provided by a coaxial axle or mount, for low friction, low wear operation. Accordingly, the reel and roll may be removed from centered position in a direction generally normal to the reel axis of rotation, against resistance imposed by the one arm supported roller acting through the belt, to be replaced by a substitute reel and tape roll, and the reel and roll are coaxially centered with minimum running friction during tape transport, all in the manner as will appear.

Additional advantage includes the following:

1. A one-piece replaceable tape unit, i.e. one reel and roll, is enabled to be driven by a belt-drive, avoiding need for a replaceable cartridge employing several rotatable parts such as hubs and rollers.

2. The use of a spring means to urge two arm-supported rollers in arcs tending to maintain the belt in arcuate engagement with the tape rolls reduces the belt and roller design requirements, i.e. inexpensive belts with round cross-section may be used, and the requirements for precisely aligned rollers and shafts are substantially reduced.

3. Large speed differentials may easily be generated, leading to improved tape handling reliability because slack (especially during loading) is taken up more rapidly.

4. Fixed reel centers are employed, which provides better resistance to shock and vibration; also the geometry of the belt drive provides for belt length that remains nearly constant for all tape positions on the two reels, whereby the elastic characteristics of the belt are more nearly uniform with temperature, and from beginning to end of tape transport between the two rolls. Also, the normal forces between the arm supported "floating" rollers and the tape packs or rolls may be independent of the belt elastic characteristics and therefore more precisely controlled. The two "floating" roller design further enables optimum belt wrap angles around the tape packs, improving traction so that higher acceleration deceleration rates may be achieved.

5. Simplicity and reliability of tape self threading, in a belt-drive environment, are achieved.

These and other objects and advantages of the invention, as well as the details of an illustrative embodiment, will be more fully understood from the following description and drawings, in which:

DRAWING DESCRIPTION

FIG. 6 is an enlarged fragmentary section on lines 6—6 of FIG. 4;

FIG. 7 is an enlarged fragmentary section on lines 7—7 of FIG. 4, showing winding of leader on the take-up reel;

FIG. 8 is a view like FIG. 7 showing the take-up reel after winding of tape on the take-up reel;

FIG. 9 is an enlarged fragmentary section on lines 9—9 of FIG. 4;

FIG. 10 is a view like FIG. 9, but showing tape wound on the take-up reel;

FIG. 11 is a perspective showing of the self-sealing supply reel seen in FIG. 4, the reel rotating in tape unwinding direction;

FIG. 11a is a fragmentary section showing stripping of tape off the supply reel;

FIG. 11b is fragmentary section in side elevation showing stripping of tape off the supply reel;

FIG. 11c is a fragmentary showing of a leader tail;

FIG. 12 is a view like FIG. 11, but showing the reel rotating in tape re-winding direction;

FIG. 13 is a section on lines 13—13 of FIG. 4;

FIG. 14 is a section on lines 14—14 of FIG. 4;

FIG. 15 is a vertical section on lines 15—15 of FIG. 4;

FIG. 16 is a perspective view of apparatus embodying the invention;

FIGS. 17 and 18 are sections showing other belt cross sections;

FIG. 19 is a view like FIG. 1, showing a modification;

FIG. 20 is a section taken on lines 20—20 of FIG. 19;

FIG. 21 is a section taken on lines 21—21 of FIG. 19;

FIG. 25 is a top view showing still another modification.

DETAILED DESCRIPTION

Figure 1:
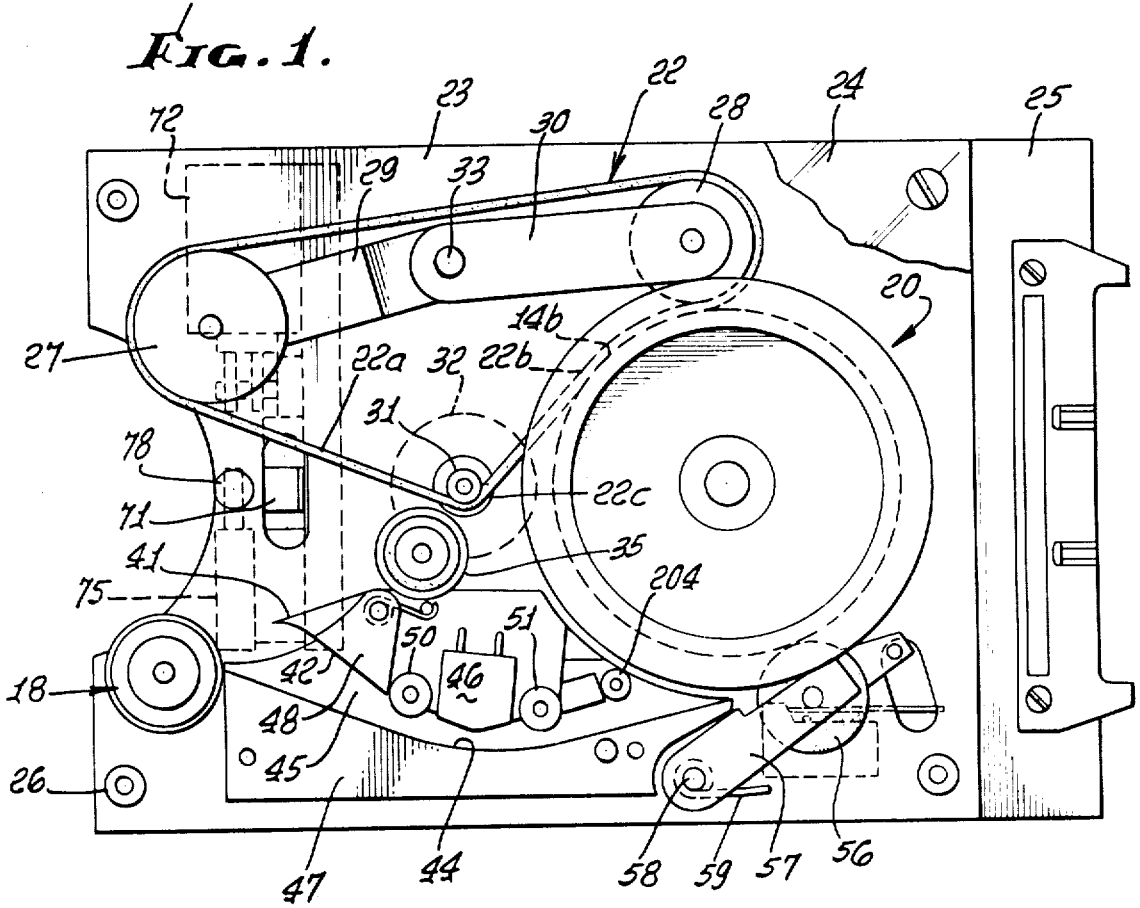
FIG. 1 is a side elevation showing tape transport apparatus incorporating the invention, but without insertion of a supply reel.
Figure 2:
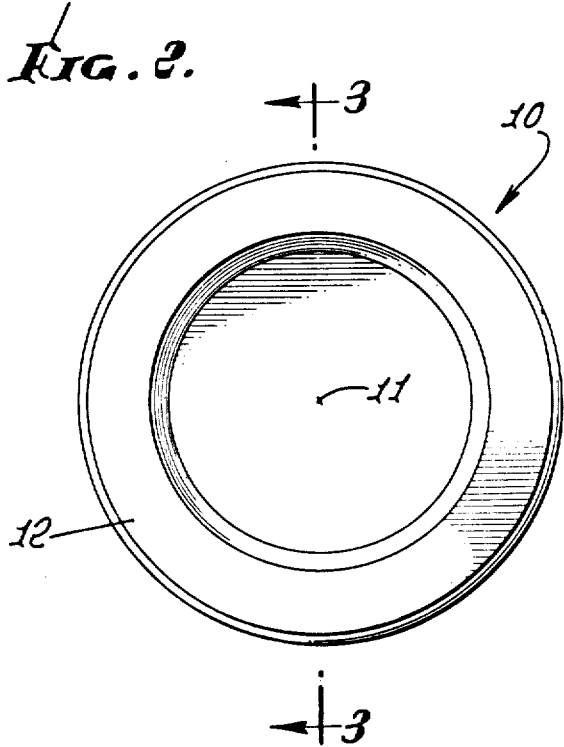
FIG. 2 is a side elevation showing a supply reel.
Figure 3:
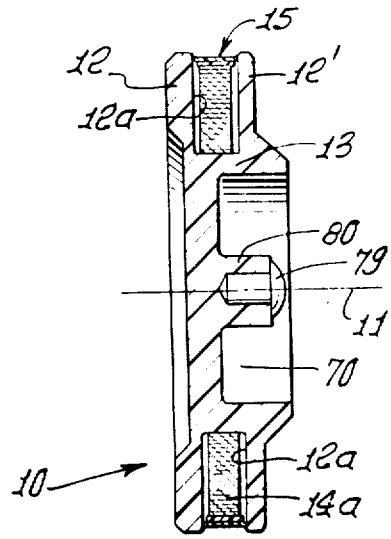
FIG. 3 is a section taken on lines 3—3 of FIG. 2.

Referring to FIGS. 2–6, 11 and 16, the tape storage or supply unit comprises a self-sealing supply reel 10 having an axis 11, spaced flanges 12 and 12' extending in planes normal to the axis, and a hub 13, about which stored magnetic tape 14 is wound in a spiral pack 14a between the flanges. Note that the tape width is less than the width of the space between the flange inner walls 12a, there being slight clearance therebetween.

The numeral 15 indicates a thin leader strip connected with the end of the tape, the strip for example consisting of plastic such as MYLAR. While being lengthwise flexible, the leader is resiliently flexible widthwise so as to tend toward a flat planar configuration as indicated in solid lines in FIG. 11c. Further, the width of the leader is typically greater than the tape width, as well as the width of the gap between flange inner faces 12a. In stored condition, as seen in FIG. 6, the opposite edges 15a of the leader are flexed to frictionally grip the inner walls of the flanges as seen in FIG. 6, and extend annularly about the hub in radially outwardly spaced relation thereto; accordingly, when the length of the stored leader is at least about equal to the circumference of the wound tape pack, the tape 14 is protectively confined inwardly of the leader and between the flanges. See also my copending application Ser. No. 628,117, filed Nov. 3, 1975.

FIG. 6 illustrates the manner in which the leader strip may be forcibly displaced into stored position. For this purpose, the flanges 12 and 12' may have annularly opposite faces 12b which taper radially inwardly to guide the leader opposite edges toward the flange inner walls 12a. In addition, a leader engaging rotor 18 has a land portion 18a which projects between the flanges 12 and 12' so as to be in local contact with the leader to bow it widthwise and toward the reel axis for forcibly urging or "snapping" the leader opposite edges 15a against inner walls 12a. FIG. 6 shows this stored and temporary resiliently bowed or locally flexed condition of the leader.

FIG. 6 also illustrates the engagement of the annular peripheries 19a of rotor flanges 18b with the peripheries 12c of the reel flanges 12 and 12'. Such interengagement locates the land portion 18a generally between the flanges 12 and 12' so as to forcibly bow the leader, enabling camming of the leader opposite edges 15a over the edges 20 between surfaces 12b and inner walls 12a. Edges 12b may be rounded, if desired.

Figure 4:
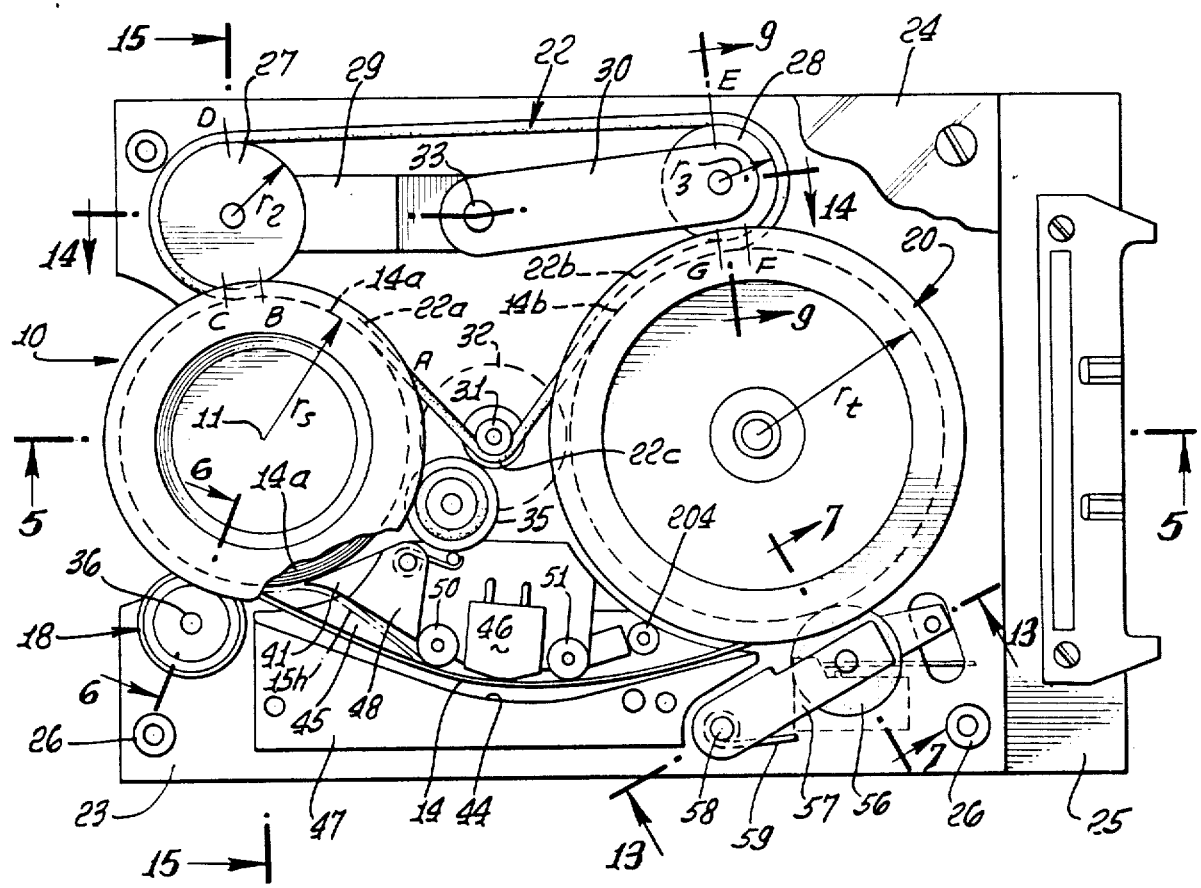
FIG. 4 is a view like FIG. 1 showing the apparatus in operation with the supply reel inserted.

Referring now to FIGS. 1 and 4, the tape transport assembly basically comprises a pair of reels for tape 14 to be transported from a supply roll or pack 14a on one reel such as reel 10 to a take-up roll or pack 14b on the other reel, as for example at 20; also, an endless belt, as at 22, is located to arcuately engage the tape rolls on the respective reels for rotating the tape rolls on the reels to effect tape transport between the rolls in response to endwise travel of the belt. Finally, support means is provided to support the reels and belt to accommodate bodily displacement of at least one of the reels (as for example reel 10) relative to the belt and into and out of transport position (as seen in FIG. 4) in which the tape roll 14a on reel 10 arcuately deflects and engages a first section 22a of the belt. FIG. 1 shows the belt first section 22a in undeflected condition prior to loading of the reel 10 and tape roll 14a into transport position.

The support means may advantageously include a frame which may, for example, include a support plate 23 and wall 24 and circuit board 25 interconnected by posts 26; also, the support means may be considered to include belt rollers 27 and 28 entraining the belt, and arms 29 and 30 supporting such rollers to swing in arcs. As illustrated one idler roller 27 is carried by arm 29 to swing bodily clockwise in FIG. 4 and in an arc relative to the frame in response to displacement of tape loaded reel 10 into and out of transport position; further, arm 29 supports belt roller 27 to swing counterclockwise in an arc tending to maintain arcuate engagement of the belt first section 22a with the tape roll 14a on reel 10, during tape transport. Similarly, second arm 30 supports idler roller 28 to swing in a clockwise arc tending to maintain arcuate engagement of a second section 22b of the belt with the tape roll 14b on reel 20. FIGS. 4 and 14 show arms 29 and 30 pivoted at 33 about a common axis, and a torsion spring 34 acting to resiliently urge the arms toward the tape packs. The spring turns are wrapped about pivot post 33 attached to plate 23. FIGS. 9 and 10 show positions of arms 30 and roller 28 during tape build-up on reel 20.

The support means may also include a motor driven pulley 31 entraining the belt at 22c between sections 22a and 22b, there being a drive such as single motor 32 operatively connected with the pulley to rotate same. The belt itself may consist of an elastomeric material, and may advantageously have circular cross-section; thus, the belt may consist of a rubber O-ring, for example. Consequently, rollers 27 and 28 may comprise pulleys.

The support means may include auxiliary rollers carried by the frame to be engaged by reel 10 in response to bodily displacement of reel 10 into loaded or inserted position, seen in FIG. 4. Such auxiliary rollers may include idler roll 18 previously described, and roll 35 having a construction similar to that of roll 18. Accordingly, roll 35 also has flanges corresponding to flanges 18a and 18b, with the same or similar functions. FIG. 6 shows roller 18 rotatably mounted on a shaft 36 carried by plate 23, and roller 35 may be similarly rotatably mounted, in fixed position relative to plate 23.

Figure 5:
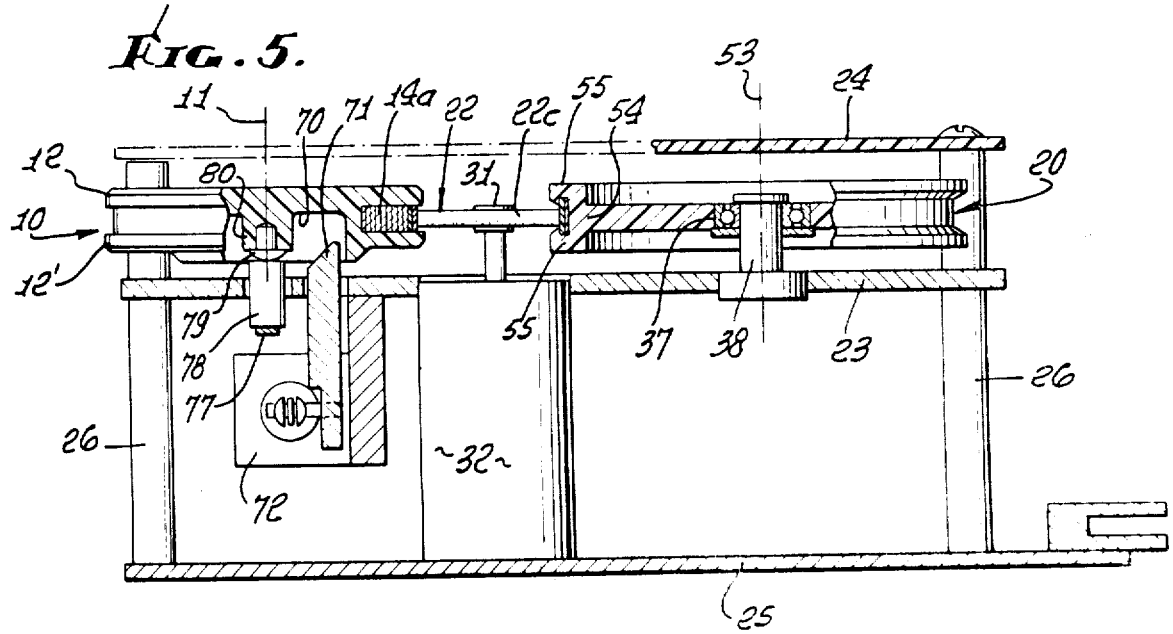
FIG. 5 is a horizontal section on lines 5—5 of FIG. 4.
Figure 22:
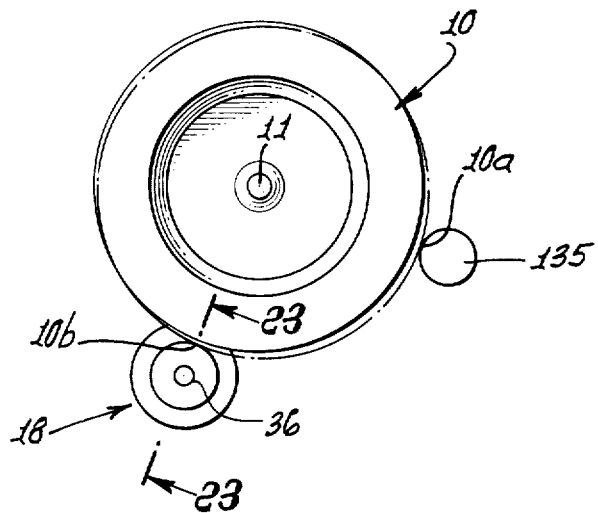
FIG. 22 is a schematic showing of reel re-positioning.
Figure 23:
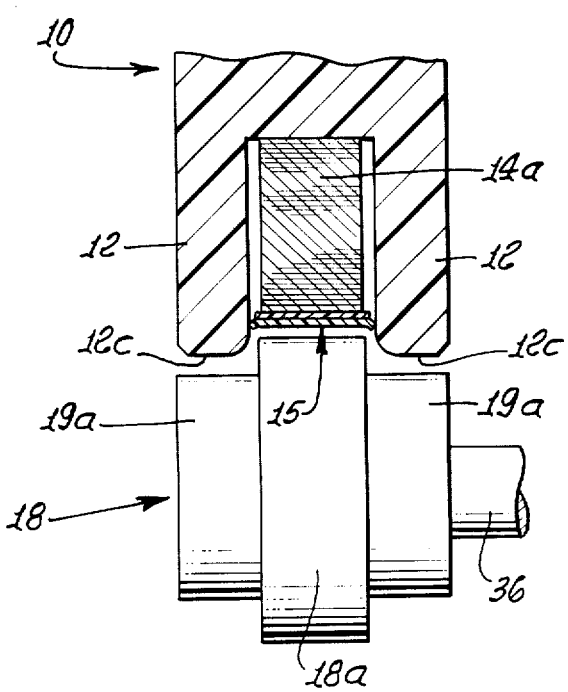
FIG. 23 is an enlarged section on lines 23—23 of FIG. 22.

Reel 20 is suitably mounted in fixed position, as by anti-friction bearings 37 and axle 38 seen in FIG. 5. Axle 38 is carried by plate 23.

Referring now to FIGS. 1, 4, 11, 11a and 11b, it will be noted that a stripper finger 41 projects between the leader 15 and the tape 14 in the pack on the reel 10, and between flanges 12 and 12', the finger serving to strip the leader free of the walls 12a as the reel rotates in a tape supply direction (see FIG. 11). Finger 41 has opposite faces 42 and 43 tapering toward an apex at 41a, face 43 lying generally parallel to and adjacent the surface of the tape pack. Downwardly lengthwise concave face 42 of the finger deflects the stripped leader and tape toward and into wide guide slot 45 for receiving and guiding the unwinding leader and tape. FIG. 11a shows that the face 42 preferably has sections 42a which taper toward the underside of the leader to bow it outwardly during stripping. FIGS. 11b and 11c show a tab or tail 15e on the end of the leader and which diverges outwardly away the stored leader to provide a gap 200 into which the stripper finger is received to initiate stripping. Slot 45 extends as shown in FIG. 4 toward a read/write head 46, adjacent which the tape is passed.

The tape guide means may also be considered to include structure 47 forming upwardly concave guide surface 44, and acting with structure 48 to form the wide slot 45 to guide the leader during threading. Broken line 15h in FIG. 4 indicates the leader path during initial threading. The guide means may also include tape guides such as idler rollers 50 and 51 the peripheries of which are generally tangent with the tensioned tape as it travels lengthwise in the slot 45. FIG. 12 shows the leader 15 being wound on reel 10 as the latter rotates in re-wind mode. Connection of the leader with the tape appears at 201. The length of the leader is typically sufficient to at least once overlap the connection 201.

FIGS. 5 and 7-10 show the construction of the second or take-up reel 20 having an axis 53, hub 54, and spaced flanges 55 projecting normal to axis 53 and radially outwardly of the hub. An idler rotor or roller 56 is located to receive the leader 15 delivered from slot 45 toward the periphery of the hub 54 adjacent the periphery of rotor 56. Rotor 56 is pivotably carried by an arm 57 pivoted to post 58 connected to the frame. Torsion spring 59 urges the arm and rotor 56 toward reel 20, the rotor penetrating between flanges 55 and seen in FIGS. 4, 7 and 8.

As the reel 20 and rotor 56 rotate in take-up mode, the leader entering therebetween is bowed or flexed so that the leader edge portions 15a are forced into grooves 64 sunk in the inner faces of flanges 55 and the leader 15 and tape 14b compressively stored as seen in FIG. 8. Such faces taper at 55a toward the leader annular storage zone between the grooves, and adjacent the outer surface 54a of the hub. The radial thicknesses of the grooves 64 are wide enough to allow one or more thicknesses of the leader to "snap" in place. Formation and storage of the tape in a tight pack 14b outwardly of the leader 15 in FIG. 8 is facilitated by the frictional capture of the leader in grooves 64, as described. A layer 203 of non-slip material such as rubber or soft plastic may be located at the take-up reel hub surface to prevent slippage of the leader captured in the grooves 64. The take-up rotor 56 may include a central land portion having a flat periphery 56a the width of which is slightly less than the gap width between the inner edges 55b of faces 55a.

In re-wind mode with the reels rotating clockwise in FIG. 4, the tape feeds off the pack 14b adjacent the periphery 56a of rotor 56, then travels lengthwise through slot 45; the tape is then guided by slot boundaries and roller guides 50 and 51 into adjacency to the hub surface 13a. of reel 10, and the tape wraps about that hub to form pack 14a seen in FIG. 6. Ultimately, the leader is stripped off reel 20 by roller 204, travels back through slot 45, and is stored in position about the tape pack 14a in the manner described above in connection with FIG. 6.

In operation, tape tension is generated and maintained primarily by a so-called "Pinch Zone Approach Radius Effect." As the belt 22 travels from A to B, in FIG. 4, it is bent so that it has a negative radius $r_s$ (with respect to the center of roller 27) $r_s$ being the belt contact radius of pack, 14a. Since the approach radius of the belt is negative when it enters the pinch zone B-C, the supply tape pack 14a will attempt to rotate slower than the ratio of $r_s$ over $r_2$ would indicate, $r_2$ being the belt contact radius of roller 27. Then as the belt travels from E to F it has a positive radius $r_3$ (with respect to the center of roller 28), and therefore the take-up pack 14b attempts to rotate faster than the ratio of $r_t$ over $r_3$ would indicate, $r_t$ being the belt contact radius of tape pack 14b. This speed differential between the surface velocity of the take up pack and supply pack results in the tape tension across the magnetic head. Since the tape is relatively stiff (compared to the belt), it is not stretched appreciably, therefore the surface velocities of the tape packs are forced to be the same. This, in turn, loads the belt system so that the speed difference is made up through belt stretch, and shear deflection at the contact points. If the normal force is high enough on the idler rollers, no slippage will occur in the pinch zones B-C and F-G. This results in a positive drive coupling which, due to the system symmetry, operates equally well in both tape directions. Tape tension is controlled by selecting the radii for rollers 27 and 28 and by selecting the belt thickness and stiffness.

Referring now to FIGS. 1, 3, 5 and 15, reel 10 defines an annular recess 70 extending about axis 11 and facing laterally parallel to that axis. A latch 71 and solenoid actuator 72 therefor are carried by the frame, i.e. by plate 23, the latch being actuable by the solenoid, as via bell crank 74, so as to advance and project into the recess 70 when the reel 10 is fully received into tape transport position (see FIGS. 4 and 5). Accordingly, the reel cannot be retracted from that position during tape transport. Actuation of the latch solenoid may be accomplished by external electronic logic which prevents removal of the reel while the tape is still threaded in the transport. The switch 75 has a contact operating plunger 76, the latter is displaced by an arm 77 which is in turn displaced clockwise in FIG. 15 by plunger 78. Plunger 78 is displaced by a convex button or head 79 carried by the reel 10 central boss 80. Therefore, when the reel reaches FIG. 15 position, the switch actuates (if button 79 is in place) to permit the "write" electronics 206 to write on the tape. If the button 79 is not in place, the write electronics cannot be energized.

Referring to FIG. 16, a carrier, such as closure 85 and channel member 86 on the closure, is movably carried by the frame to releasably carry the reel 10. Thus, for example, the closure 85 may be pivotally carried at 86 by the frame panel or wall 23a to pivot between lowered retracted position as shown and raised advanced position, closing the opening 87 in tranport housing 88. In retracted position as shown, the reel 10 may be placed into or removed from the channel member 86, the webs of which loosely support the reel periphery. In raised advanced position, of the closure 85, the reel is inserted into transport position as seen in FIG. 4, and the latch is operated. When the latch is released, the closure may be opened to retract the reel into access position.

As disclosed in my co-pending U.S. patent application Ser. No. 628,117 filed Nov. 3, 1975, the leader strip 15 may consist of two sub-strips 15b and 15c which are interconnected in stacked relation, with edge portions 15a defined by one strip 15b projecting laterally beyond the edges 15d defined by the second sub-strip. The construction is such that the overall leader strip 15 has lengthwise bending stiffness which is substantially greater than leader strip characteristic widthwise bending stiffness; i.e. the two sub-strips may have different bending moduli, and one sub-strip 15b may consist of vinyl while the other sub-strip 15c may consist of MYLAR (with greater bending stiffness). Accordingly, the edge portions 15a of the leader are engageable with the non-grooved inner walls 12a of the flanges 12 and 12' of reel 10 to be frictionally retained in position between those walls, this construction being of unusual advantage in the herein disclosed belt driven transport since the belt cooperates with the leader 15 which may have different radial positions depending upon the tape wrap characteristics, there being no leader trapping grooves in the flange walls. Also, the width tolerances of the reel walls 12a are less critical.

FIGS. 17 and 18 show alternative drive belts 122 and 222 respectively having triangular and rectangular cross sections, which can also be used in place of the round cross section belt depicted.

Referring now to FIGS. 19–23, a modification is shown and is characterized as providing means to initially receive and peripherally support or locate a tape reel, together with means to subsequently centrally support the tape reel for rotation, and preferably in bodily displaced position to reduce or eliminate frictional engagement with one or more of the peripheral supports. As a result, wear and friction are reduced, less debris is produced by frictional wear (such debris otherwise tending to possibly gather on the tape to pass under the read/write head and produce an error) and the need for anti-friction bearings for the peripheral supports (such as rollers) is avoided.

In the illustrated example, certain elements remain the same as before, and therefore bear the same numerals. At least one peripheral support peripherally engages the one reel 10 to position same upon its initial reception (in a rightward direction normal to reel axis 11 in FIG. 19) into the assembly. For example, the support post 135 is initially engaged by the reel 10, as shown by the reel engagement locus 10a in FIG. 22; likewise, a second peripheral support in the form of rotor 18 peripherally engages and seats the reel 10, at reel broken line locus 10b in FIG. 22, upon its initial reception into the assembly as described. More specifically, the rotor annular peripheries 19a are initially engaged by the peripheries 12c of the reel flanges 12. The loci 10a and 10b are spaced about the reel axis 11 from the locus of belt engagement with the tape roll, as seen in FIG. 19.

The centering support means for reel 10 is carried by the assembly for relative movement into reel centrally supporting relation or position, in which reel 10 is displaced out of peripheral engagement with at least one of the peripheral supports and the reel is also centrally supported for rotation. See for example the solid line reel peripheries in FIGS. 19, 22 and 23 wherein there are slight gaps between the reel flange peripheries 12c and the rotor peripheries 19a, and also the post 135.

The centering support means may advantageously comprise a plunger 136 which is coaxial with the reel axis 11 in advanced position as seen in FIG. 20. The plunger 136 is shown to have a reduced diameter pin extension 136a which has running fit with the bore 137 in the reel hub or boss 80, the face of the boss slidably engaging step shoulder 138 on the plunger. A flat spring 139 attached to post 26 carries a bead 140 engaging the opposite side of the reel lightly biasing same toward the plunger. The end of pin 136a is rounded to cam into the bore 137 to bodily displace the reel normal to its axis, and away from the post 135 and rotor 18, as described, when the plunger is advanced to FIG. 20 position.

Actuating means is provided to bodily advance and retract the plunger into and out of reel centrally supporting position. Such actuating means may advantageously comprise a lever 141 operatively connected with the plunger, as via transverse pin 142 which extends through a bifurcated portion of the lever and through the plunger. Tongue and groove structure 143 carried between plates 23 and 25 supports the lever to pivot in plunger advancing and retracting directions, as is clear from FIG. 20. The lever may typically project at 141a free of a case 144 for the assembly, for manual manipulation.

Also included is a latch, as at 150 in FIG. 21, located to block retraction of the plunger 136 while the tape 14 is unwound from the reel 10. A solenoid 151 is connected with the latch, as via solenoid plunger 152 to displace the latch away from the end of cross-pin 142 to unblock retraction of plunger 136 as when tape becomes fully wound back on the reel 10. A switch 154, operated by lever 141 (as via engagement of arm 154a with pin 142) indicates whether the lever 141 is in the "run" or "unload" position so that the solenoid can be externally controlled.

Finally, a switch 156 is provided to be responsive to the WRITE protect ring 157. If the WRITE protect ring 157 is not in place in reel 10 the WRITE circuitry 161 associated with a tape WRITE head, as at 46, cannot be energized. Therefore, if the reel does not have a WRITE protect ring inplace, the previously written information on the magnetic tape is protected. In FIG. 20 the switch has an arm 156a engageable with a reel annular insert 157 at the plunger side of the reel, and at a location offset from the reel axis. In FIG. 25, the switch 156 has its arm 156a engageable with a WRITE protect plug 158 carried by the reel at the side thereof opposite the plunger, and at a location proximate the reel axis. The WRITE protect plug 158 may comprise a pin having opposite ends 158a and 158b of shorter and longer lengths. In the position shown, the short length 158a is engaged by the switch arm 156a, so that the switch 156 is not energized; however, if the pin is reversed in the reel, the long length 158b is engaged by the arm 156a to activate the switch thereby disabling the WRITE circuits and protecting previously written information on the magnetic tape. Bore 159 in the reel selectively receives the pin lengths 158a and 158b, there being a flange 158c separating them and engaging the reel face 160.

Figure 24:
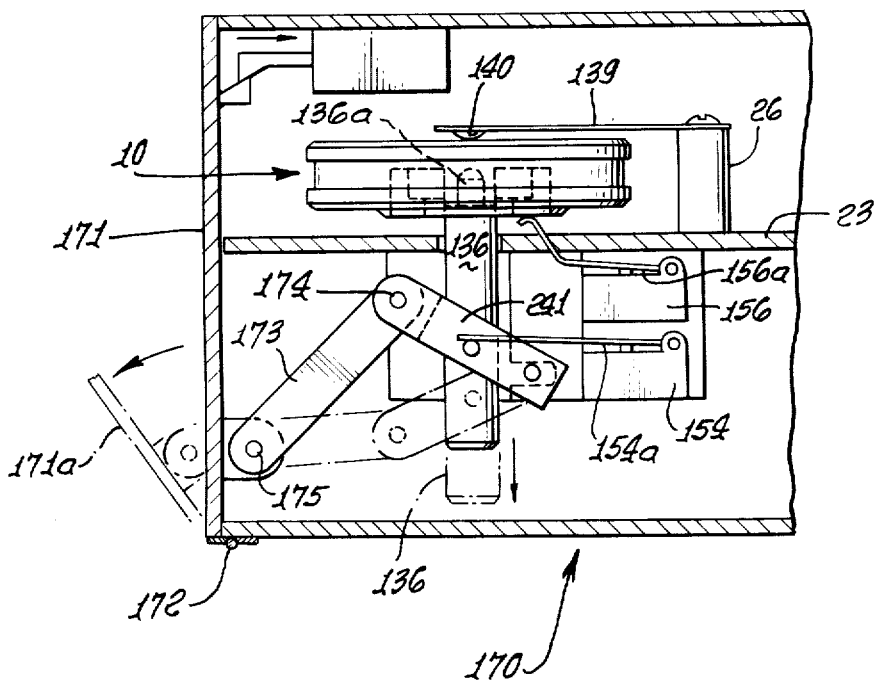
FIG. 24 is a view like FIG. 20, showing a further modification.

In FIG. 24, the transport case 170 has a closure 171 swingable outwardly, as shown by broken lines 171a, and on hinge 172, to allow insertion of the reel 10. The lever 241 (corresponding to lever 141) is operatively connected with the closure as via link 173 and pivots 174 and 175. As the closure is opened, the plunger 136 is retracted to the "unload" position, and as the closure is closed, the plunger 136 is advanced to reel centrally supporting position, or "run" position.

I claim:

1. In a tape transport assembly that includes
   a. a pair of reels for tape to be transported from a supply roll on one reel to a take-up roll on the other reel,
   b. at least one initial support to initially engage one of said reels to position same upon initial reception thereof in said assembly,
   c. centering support means carried by the assembly for relative movement into and out of centrally supporting position in which said one reel is displaced out of engagement with said initial support and is centrally supported for rotation, and
   d. an endless belt located to arcuately engage the tape rolls on the respective reels for rotating the rolls and reels to effect said transport in response to endwise travel of the belt, the belt remaining in proximity with the tape roll on said one reel during said reel displacement by said centering support means.

2. In a tape transport assembly that includes
   a. a pair of reels for tape to be transported from a supply roll on one reel to a take-up roll on the other reel,
   b. at least one peripheral support to peripherally engage one of said reels to position same upon initial reception thereof in said assembly,
   c. centering support means carried by the assembly for relative movement into and out of centrally supporting position in which said one reel is displaced out of peripheral engagement with said peripheral support and is centrally supported for rotation, and
   d. an endless belt located to arcuately engage the tape rolls on the respective reels for rotating the rolls and reels to effect said transport in response to endwise travel of the belt, the belt remaining in engagement with the tape roll on said one reel during said reel displacement by said centering support means.

3. The assembly of claim 2 including belt rollers entraining the belt, one of the rollers carried for bodily movement relative to the frame in response to said displacement of the one reel by said centering support means.

4. The assembly of claim 3 including a drive engaging the belt for endwise advancing same.

5. The asembly of claim 1 wherein the one reel has an axis and said one peripheral support comprises a post initially engaging the periphery of the one reel upon said initial reception thereof in a direction normal to the reel axis.

6. The assembly of claim 2 wherein the one reel has an axis, and including a second peripheral support, said first and second peripheral supports initially peripherally engaging said oen reel upon said initial reception thereof in a direction normal to the reel axis, and at loci spaced about said axis from the locus of belt engagement with the tape on said one reel.

7. The assembly of claim 6 wherein said second support comprises a rotor having a land to project between flanges defined by said one reel to forcibly bow a leader into position between the flanges in response to winding of the leader onto tape on said one reel, said rotor having annular peripheries to engage peripheries of said flanges, said flange peripheires subject to displacement out of engagement with said rotor annular peripheries during said one reel displacement into centrally supported position.

8. The assembly of claim 7 wherein said one support comprises a post located between said second support and the locus of belt engagement with the tape on said one reel, in a circular direction about the reel axis.

9. The assembly of claim 1 wherein said centering support means comprises a plunger, and there being actuating means to bodily advance and retract the plunger into and out of reel centrally supporting position.

10. The assembly of claim 9 wherein said actuating means comprises a lever operatively connected with the plunger, and structure supporting the lever to pivot in plunger advancing and retracting directions.

11. The assembly of claim 10 including a case for said assembly, said lever projecting free of the case for manual operation.

12. In a tape transport assembly that includes
    a. a pair of reels for tape to be transported from a supply roll on one reel to a take-up roll on the other reel, p1 b. at least one peripheral support to peripherally engage one of said reels to position same upon initial reception thereof in said assembly, and
    c. centering support means carried by the assembly for relative movement into and out of centrally supporting position in which said one reel is displaced out of peripheral engagement with said peripheral support and is centrally supported for rotation, said centering support means comprising a plunger, and there being actuating means to bodily advance and retract the plunger into and out of reel centrally supporting position, said actuating means comprising a lever operatively connected with the plunger, and structure supporting the lever to pivot in plunger advancing and retracting directions,
    d. and including a case for said assembly, the case having a closure, the lever projecting free of the case for manual operation and the lever operatively connected with the closure to advance the plunger into reel centering position in response to displacement of the closure to closed position.

13. The assembly of claim 10 including a latch located to block retraction of the plunger while tape is being unwound from the one reel.

14. The assembly of claim 13 including a solenoid operatively connected with the latch to displace same to unblock retraction of the plunger, when tape is fully wound on the one reel, there being a lever operated switch to sense the position of the plunger for external control of the solenoid and tape drive circuits defined by the assembly.

15. In a tape transport assembly that includes
    a. a pair of reels for tape to be transported from a supply roll on one reel to a take-up roll on the other reel,
    b. at least one peripheral support to peripherally engage one of said reels to position same upon initial reception thereof in said assembly, and
    c. centering support means carried by the assembly for relative movement into and out of centrally supporting position in which said one reel is displaced out of peripheral engagement with said peripheral support and is centrally supported for rotation, said centering support means comprising a plunger, and there being actuating means to bodily advance and retract the plunger into and out of reel centrally supporting position, said actuating means comprising a lever operatively connected with the plunger, and structure supporting the lever to pivot in plunger advancing and retracting directions, d. and a switch actuated in response to reception of the one reel by the assembly to prevent WRITE circuitry associated with a tape WRITE head defined by the assembly from being inadvertently energized.

16. The assembly of claim 15 wherein said switch has an arm engageable with an annular ring carried by the reel at the plunger side thereof, and at a location offset from the reel axis.

17. The assembly of claim 15 wherein the switch has an arm engageable with a WRITE patent plug carried by the reel at the side thereof opposite the plunger, and at a location proximate the reel axis.

18. In a tape transport assembly,
a. first means to initially receive and peripherally locate a tape reel,
b. other means to subsequently centrally support the tape reel for rotation,
c. and belt means engaging tape on the reel when the reel is initially received by said first means and also engaging tape on the reel when the reel is subsequently centrally supported by said other means for rotation.

19. The assembly of claim 18 wherein said first means are located to position the reel in an initial position prior to central support thereof, and said other means are located to centrally support the reel in a subsequent position which is offset from the initial position in a direction normal to the reel axis.

* * * * *